United States Patent
Kiilerich et al.

(10) Patent No.: US 8,818,941 B2
(45) Date of Patent: Aug. 26, 2014

(54) ARRANGEMENT FOR SYNCHRONIZING MEDIA FILES WITH PORTABLE DEVICES

(75) Inventors: Dennis Kiilerich, Seattle, WA (US); Andrew L. Silverman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1158 days.

(21) Appl. No.: 12/031,708

(22) Filed: Feb. 15, 2008

(65) Prior Publication Data

US 2009/0125571 A1    May 14, 2009

Related U.S. Application Data

(60) Provisional application No. 60/987,079, filed on Nov. 11, 2007.

(51) Int. Cl.
*G06F 17/00* (2006.01)
*G06F 15/16* (2006.01)
*G06F 17/30* (2006.01)

(52) U.S. Cl.
CPC .... *G06F 17/30017* (2013.01); *G06F 17/30902* (2013.01); *Y10S 707/913* (2013.01)
USPC ........... 707/620; 707/618; 707/621; 707/625; 707/694; 707/821; 707/913; 709/203; 709/206

(58) Field of Classification Search
CPC .................................. G06F 17/00; G06F 17/30
USPC ........................ 707/999.2–999.204, 624, 609, 707/610–614, 618, 620, 621, 625, 694, 821, 707/913–916; 709/203, 206
See application file for complete search history.

(56) References Cited

U.S. PATENT DOCUMENTS

| | | | |
|---|---|---|---|
| 6,304,891 B1 * | 10/2001 | Anderson et al. | 718/107 |
| 6,317,797 B2 | 11/2001 | Clark et al. | |
| 6,446,080 B1 * | 9/2002 | Van Ryzin et al. | 1/1 |
| 6,721,489 B1 * | 4/2004 | Benyamin et al. | 386/243 |
| 6,959,288 B1 * | 10/2005 | Medina et al. | 705/51 |

(Continued)

FOREIGN PATENT DOCUMENTS

| | | | |
|---|---|---|---|
| EP | 1431977 A3 | * | 6/2004 |
| WO | WO 2005119677 | * | 12/2005 |
| WO | WO 2007039589 | * | 4/2007 |

OTHER PUBLICATIONS

Gamet, Jeff, "Drag-and-drop Playlists in iTunes." The Mac Observer. Oct. 24, 2006. http://www.macobserver.com/tmo/article/Drag-and-drop_Playlists_in_iTunes/.*

(Continued)

*Primary Examiner* — Srirama Channavajjala
(74) *Attorney, Agent, or Firm* — Gregg Wisdom; Judy Yee; Micky Minhas

(57) ABSTRACT

Arrangements are provided which improve the efficiency of the synchronization process. The same ensure that synchronizations of large quantities of content can be completed with a minimum of delay. One method prioritizes the various tasks that are to be performed prior to synchronization. Another method initiates dependent tasks while parsing a synchronization tasks list. Yet another method allows modification of an in-process synchronization operation to allow new synchronization tasks to be accomplished within the context of the same process, negating the need to restart synchronization.

10 Claims, 14 Drawing Sheets

(56) References Cited

U.S. PATENT DOCUMENTS

| | | | |
|---|---|---|---|
| 7,024,214 B2* | 4/2006 | Loveland | 455/502 |
| 7,096,416 B1 | 8/2006 | Smith et al. | |
| 7,107,296 B2 | 9/2006 | Novak et al. | |
| 7,136,934 B2 | 11/2006 | Carter et al. | |
| 7,743,019 B2* | 6/2010 | Shah et al. | 707/610 |
| 8,150,937 B2* | 4/2012 | Ng et al. | 709/217 |
| 8,631,088 B2* | 1/2014 | Robbin et al. | 709/217 |
| 2001/0041021 A1 | 11/2001 | Boyle et al. | |
| 2002/0194309 A1* | 12/2002 | Carter et al. | 709/219 |
| 2003/0167318 A1 | 9/2003 | Robbin et al. | |
| 2005/0114333 A1* | 5/2005 | Nagano et al. | 707/8 |
| 2005/0114711 A1* | 5/2005 | Hesselink et al. | 713/201 |
| 2005/0147130 A1* | 7/2005 | Hurwitz et al. | 370/503 |
| 2005/0234999 A1* | 10/2005 | Millikan et al. | 707/104.1 |
| 2006/0168351 A1 | 7/2006 | Ng et al. | |
| 2006/0195864 A1* | 8/2006 | New et al. | 725/25 |
| 2006/0200599 A1 | 9/2006 | Manchester et al. | |
| 2006/0230349 A1 | 10/2006 | Novak et al. | |
| 2007/0043847 A1* | 2/2007 | Carter et al. | 709/223 |
| 2007/0050458 A1 | 3/2007 | Rotzoll et al. | |
| 2007/0088727 A1* | 4/2007 | Kindig | 707/101 |
| 2007/0089057 A1* | 4/2007 | Kindig | 715/716 |
| 2007/0156779 A1 | 7/2007 | Ho et al. | |
| 2007/0169087 A1* | 7/2007 | Fadell | 717/168 |
| 2007/0174520 A1* | 7/2007 | Moon | 710/62 |
| 2008/0022208 A1* | 1/2008 | Morse | 715/727 |
| 2008/0034126 A1* | 2/2008 | Baker | 710/11 |
| 2008/0134051 A1* | 6/2008 | Chaney | 715/744 |
| 2008/0168525 A1* | 7/2008 | Heller et al. | 725/139 |
| 2010/0151783 A1* | 6/2010 | Cohen | 455/3.06 |

OTHER PUBLICATIONS

"Issues in Accessing Web Sites from Mobile Devices", Proceedings of the 3rd International Workshop on Web Site Evolution. IEEE, 2001. pp. 1-8.

Blakowski, "A Media Synchronization Survey: Reference Model, Specification, and Case Studies", 1996, IEEE. pp. 1-31.

* cited by examiner

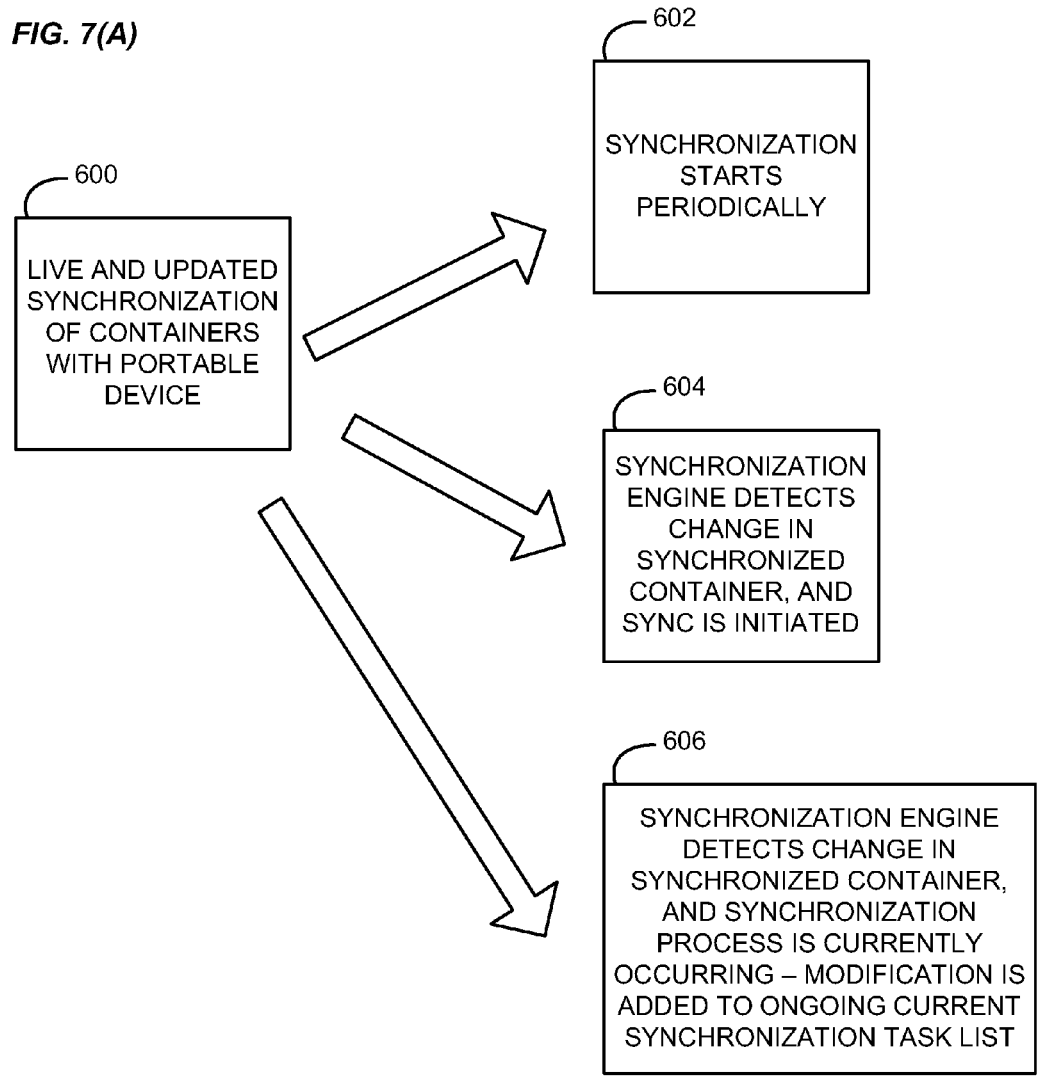

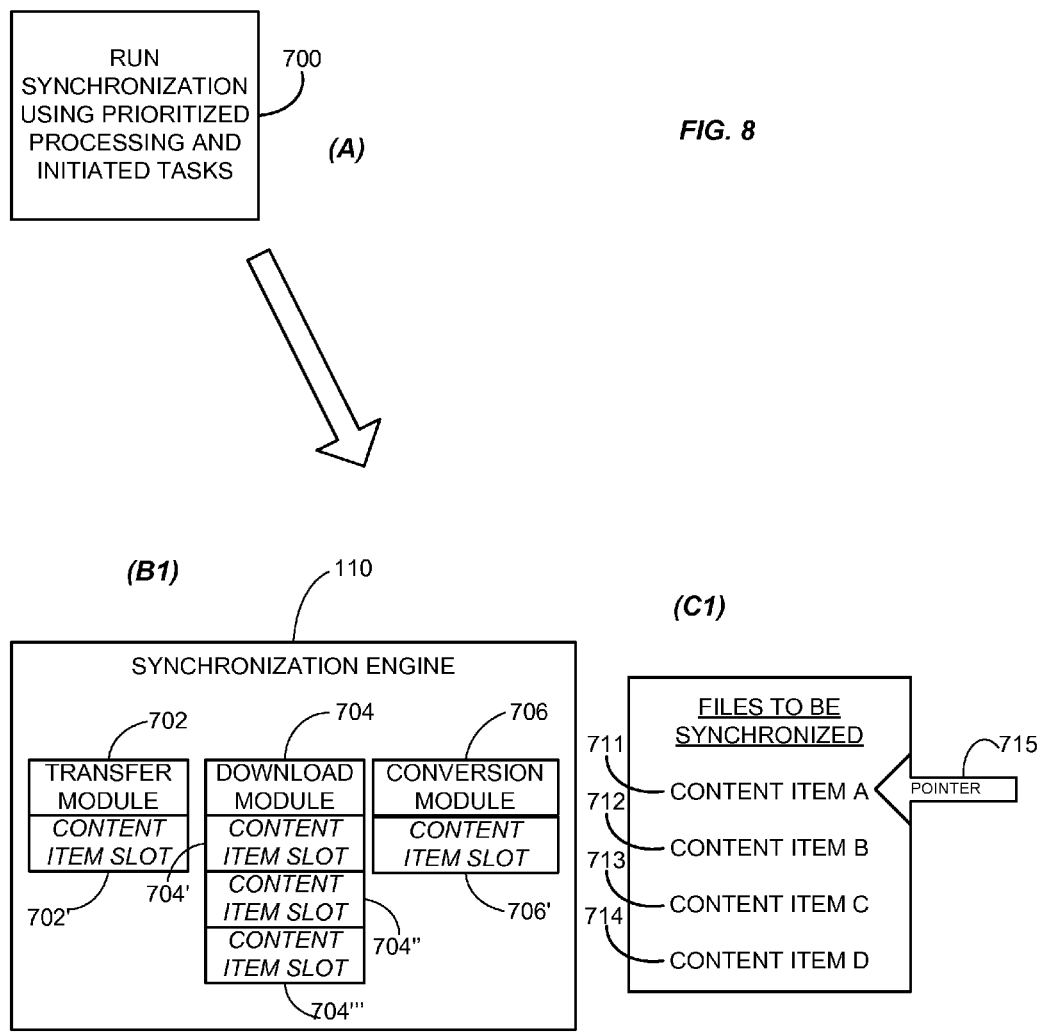

ARRANGEMENT FOR SYNCHRONIZING MEDIA FILES WITH PORTABLE DEVICES

STATEMENT OF RELATED APPLICATIONS

This application claims the benefit of U.S. Provisional Patent Application Ser. No. 60/987,079, filed Nov. 11, 2007, entitled "Arrangement For Synchronizing Media Files With Portable Devices," which is incorporated herein by reference in its entirety.

BACKGROUND

Current systems and methods that perform synchronization of content items between computers and portable storage or playback devices have certain disadvantages. For example, one difficulty is the length of the synchronization procedure. Synchronization procedures may be delayed, e.g., by bandwidth limitations for the input/output process as determined by the USB or other connection protocol. A similar limitation pertains to the processor speed. For example, if a file requires conversion before being transferred from a computer to a portable player, the conversion slows and/or delays the synchronization process considerably. A related limitation concerns when a file requires download to a local personal computer prior to synchronization on a device, which is often the case with digital music listed in a local catalog but actually stored on an internet web store for download on-demand. The download requires completion before the file can be transferred.

Another type of limitation is seen when a user's media content library exceeds the storage capacity of the portable player. Current systems for choosing which items to synchronize, and which to avoid, including smart playlists (i.e., rule-based selection mechanisms like "All songs in my library where genre does not equal 'Christmas'"), are generally complicated and confusing to many users.

A further type of limitation relates to the cumbersome nature of current synchronization procedures, i.e., a user must indicate or build a list of desired changes, e.g., items to synchronize, and then must start the procedure. As such procedures only commence upon user command, synchronization procedures are limited to occurring only at user-specified times or at the time of initial device connection. Some systems have allowed for a degree of spontaneous synchronization—synchronization may begin for some content types as soon as new content requiring synchronization is detected. In these systems, however, any currently-running synchronization must be completed or aborted before initiating a new synchronization, resulting in a less-than-optimum method.

Yet another type of limitation relates to the synchronization process itself: users generally need to have content items to be synchronized stored on their computer in some local location. Thus, content items generally occupy valuable storage space on a user system.

SUMMARY

The arrangement improves the efficiency of the synchronization process. The same ensures that synchronizations of large quantities of content can be completed with a minimum of delay. This is accomplished in various ways. One way is to prioritize the various tasks that are to be performed prior to synchronization. Another way is to initiate dependent tasks. Yet another way is to allow other content to synchronize in the meantime, increasing the efficiency of the limited transmission bandwidth.

In another example, a method is provided which allows a user to select content items for synchronization in simple and intuitive ways, using natural organizational units of given types of media, here termed "containers".

In another example, a method is provided which performs automatic or "live" synchronization, in which a user's library is continually monitored for changes to the set of content the user has indicated should be synchronized, e.g., containers. Synchronization with the portable device then occurs immediately, and continuously, until the synchronization engine determines that there are no items left to be synchronized. If a synchronization is already in-process, any new synchronization tasks may be added to, or removed from, the currently-synchronizing work flow, obviating the need for a separate synchronization process to commence.

In another example, a method is provided that allows content to be placed on a portable player without the intermediate step of having to place content (and occupy storage space within) a user media content library, such as on a user's personal computer. For example, using this arrangement, a user may place a CD of music onto a portable player without having to store the "ripped" music on the user's computer, which saves memory or hard disk space.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIGS. 7(A) and 7(B) are flowcharts illustrating more detailed aspects of a step within the synchronization method of FIG. 3.

FIGS. 8(A) and 8(B1)-(B5) and 8(C1)-(C5) illustrate a series of time-sequenced block diagrams showing the status of the arrangement after sequential steps are performed.

DETAILED DESCRIPTION

Figure 1:
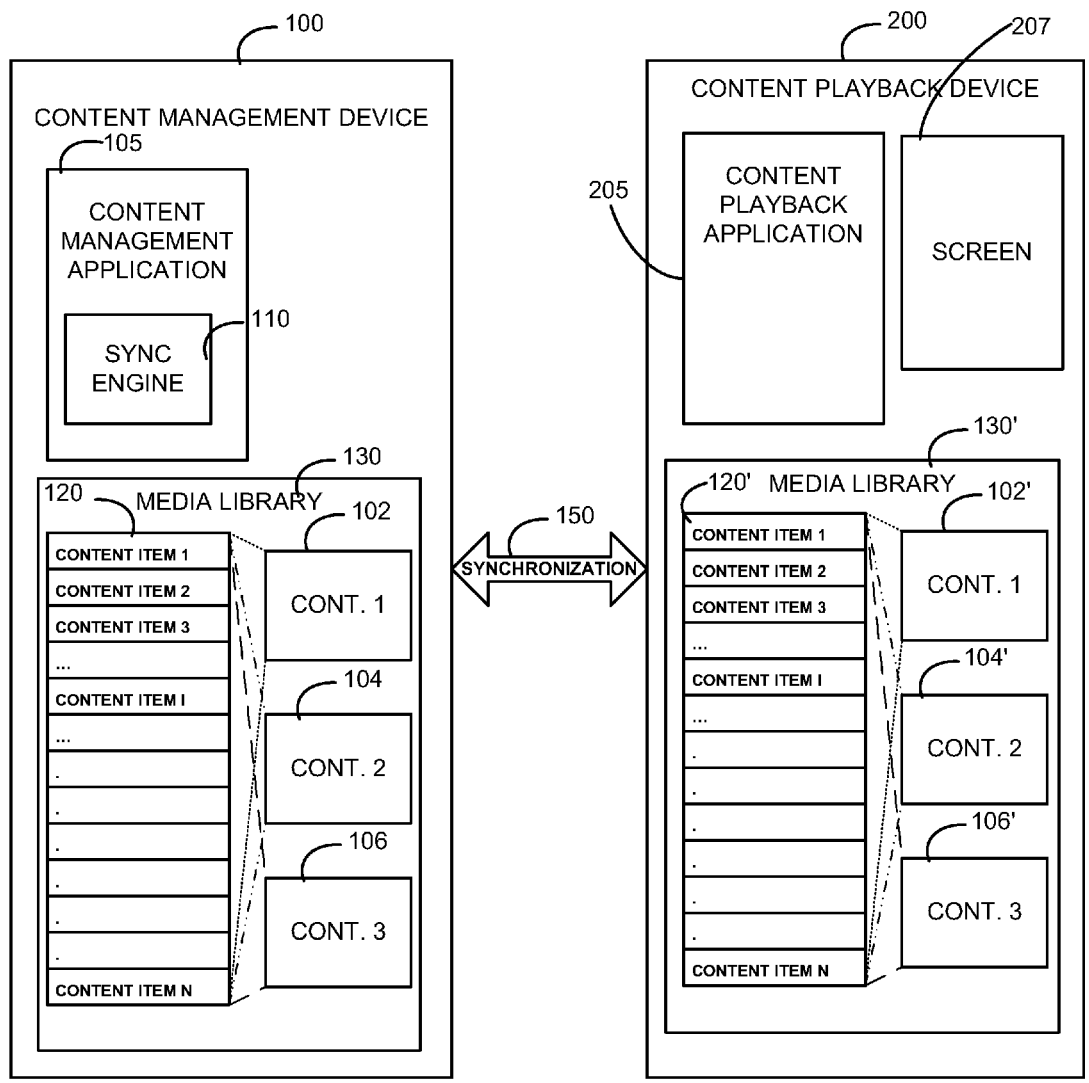
FIG. 1 illustrates a simplified functional block diagram of an exemplary arrangement in which embodiments of the method may be implemented, including a synchronization engine.

The following definitions are used in this description.

"Content items" (elements 120, 120', and 120" of FIG. 2), "items of content", or just "content" are files corresponding to music, movies, television shows, pictures, video clips, etc. The terms represent any commercial or non-commercial stored digital content. Examples include but are not limited to digital media content (such as audio files, video files, image files, multimedia files, playlists and the like). Content items may also include podcasts, which are generally episodic content made up of individual content files, plus an RSS-standard XML file that defines the series and the context, order, and description of the content of the related episodes. Content items may exist in any known or later developed format or combination thereof, and may be protected by one or more enforceable intellectual property rights of one or more third parties, such as copyrights, patent rights, trademark rights, or trade secret rights.

A "content playback device" (element 200 of FIG. 1) is any device that can play content items. Some ability to manage the content items thereon is usually accorded, such as the ability to delete a content item or to add to or modify a playlist. However, in many cases, such functionality is minimal as users prefer to manage their content on a device where the content items may be more easily visualized, such as a "content management device" described below. An exemplary content playback device is a portable music or media player.

A "content management device" (element 100 of FIG. 1) is any device whose primary function is to control and manage content items. A content management device may also play back content items. An exemplary content management device is a personal computer. A content management device may also be, e.g., a mobile phone, on which content items may be downloaded and played back or synchronized to another device.

"Synchronization" (alternatively elements 600 or 700 of FIG. 3), occurring via a synchronization link (such as link 150 of FIG. 1), refers to the act of making two sets of content items correspond to each other, one set of content items on each of two different devices, whether content management devices or content playback devices. The two sets need not be identical; rather, the correspondence is generally to add or delete content items on both, or to manage content items on both. In many cases, content is managed on a content management device and the managed content is periodically synchronized with a content playback device that the user carries as part of the user's daily routine. In many cases, content management devices can store much more than content playback devices, and thus it is a subset of content items on a content management device that is synchronized with a content playback device. Content management devices may also synchronize with content management devices—this may occur, e.g., if a user synchronizes content downloaded from an online service to a mobile phone, and then synchronizes the mobile phone to a portable media player. Synchronization may be partial; that is, only a portion of the content on one device may be synchronized to another device. This may occur, e.g., when only certain playlists are synchronized. In the current arrangement, this type of partial synchronization is performed by the use of containers. The synchronization procedure may be automatic or manual, though several embodiments of the arrangement described here employ automatic or live synchronization. In this sense, "automatic" or "live" synchronization means a synchronization process that occurs without specific user initiation of the same. "Automatic" or "live" synchronization also refers here to one in which, if a synchronization is in process and the user or another process causes a new item to require synchronization, then the new item can be added to the queue of the currently-running synchronization, i.e., there is no need to finish the currently-running synchronization process and start a new one in order to accommodate synchronization of the new item. Synchronization may also occur if a user has a content library stored online and which is accessed by, e.g., a web application. In this case, the synchronization may be directly from the online library (or other non-content management device site, such as an external drive) to a content playback device. While the term "synchronization" refers to data and information flowing in both directions between a content management device and a content playback device, the term often relates to simply downloading items from a content management device to a content playback device.

"Online service" (e.g., element 310 of FIG. 2) refers to a repository of content items which is connected to a network and which may be used to download content items or store chosen content items. In many cases, the online service is an internet storefront from which is downloaded music, videos, television shows, podcasts, video games, or other digital content items.

A "playlist" is a collection of media files to be played back in a given order as determined by the user.

A "container" (elements 102, 102', 104, 104', 106, and 106' of FIG. 1) refers to a natural organizational unit of a given type of media, and is one or a group of content items generally defined by the action of a filter on the media library (element 130 of FIG. 1). For example, for music content items such as songs, pertinent container types may include albums, artists, and genres. For podcasts, pertinent container types may include the podcast series object itself, as the podcast is made up of a series of related by distinct episodes, similar to a television series. Of course, variations may be seen, e.g., podcasts produced by a particular author or originator. For television shows, pertinent container types may include a season or a series. In many cases, containers may be defined by use of pre-existing metatags, such as ID3 tags. In other cases, containers may be defined or customized by users, e.g., such as is the case with playlists. For photos or videos, pertinent container types may include date of capture or the folder in which they are stored. Container definitions may be stored by the content management device, so that future changes in the user's collection, such as addition of new content or removal of old content which matches the selected containers, is automatically synchronized with (or removed from) the portable player without further user interaction.

Finally, a "container" may be "associated" with a content playback device when the same is the subject of an operation that transfers, copies, or otherwise causes the content items in the container to be placed onto the content playback device. This may be performed by a simple drag-and-drop operation or by any number of other such similar procedures.

Turning to the drawings, where like numerals designate like components or steps, FIG. 1 illustrates an exemplary content management device 100 connected to a content playback device 200 using a synchronization link 150. The content management device 100 includes a content management application 105, part of which is a synchronization engine 110. The content management application 105 controls how the content management device 100 interacts, controls, modifies, and adds and removes content items. The content management device 100 has stored thereon a set of content items 120, shown in FIG. 1 as content item 1, content item 2, . . . , content item I, . . . , up to content item N. The content items 120 are associated with metadata, such as ID3 tags, that in many cases provide identifying or other bibliographic information about the content items. The metadata may be stored as part of each content item's file. The collection of all the content items 120 is referred to as a media library 130.

Using the metadata or other such information, one or more containers 102, 104, 106 (corresponding to containers 1, 2, and 3) may be defined, created, or generated. The containers 102, 104, 106 may be formed by the action of a filter on a content media library 130, and may be formed automatically or in a custom fashion. The containers may generally include content items in a "natural" organization unit. For example, one container may include all songs by a particular artist, or all songs from an album. Another container may include all shows from a television series, or all shows for that series from a given season. Another container may include all podcasts from a chosen publisher. Another container may include all songs of a given genre.

The content management application may automatically create numerous such containers according to a predefined scheme, and the scheme may be updated periodically. For example, containers may be created that correspond to, for music, any and all albums, any and all artists, and any and all genres represented.

Custom containers, which may be formed on the basis of user input, may be created in either a passive or an active sense. In the former, containers may be formed such as "most played". In the latter, containers may be formed such as "highest rated". Custom containers may also incorporate complicated filtering schemes, e.g., all alternative music of the 1980s from British bands.

FIG. 1 also shows a synchronization link 150. The synchronization link 150 may be wired, such as a USB cable, or wireless, such as an IR link, Bluetooth, or 802.11 wifi. Any other wired or wireless scheme, current or later-developed, may also be employed.

FIG. 1 also shows an exemplary content playback device. The content playback device 200 includes a content playback application 205, which controls and management the content items 120' as well as their modification and playback. The content playback application 205 typically is occupied with controlling playback, but some modification capabilities may also be provided and performed, such as an ability to add an item to a playlist, alter its rating, delete the item, and so on. The content items 120' may be the same as content items 120, or may be a subset thereof. Generally, items 120 that are organized into containers 102, 104, and 106 and for which the containers have been involved in a drag-and-drop operation onto the content playback device 200, described below, are also present on the content playback device 200 as items 120'. The content items 120' may similarly be organized into containers 102', 104', and 106', and may be played back according to their placement in those containers, or may be played back in any other way, such as using playlists. The collection of all the content items 120' is referred to as a media library 130'. The user controls operation of the content playback device 200 by manipulation of items on a screen 207 having a user interface.

Figure 2:
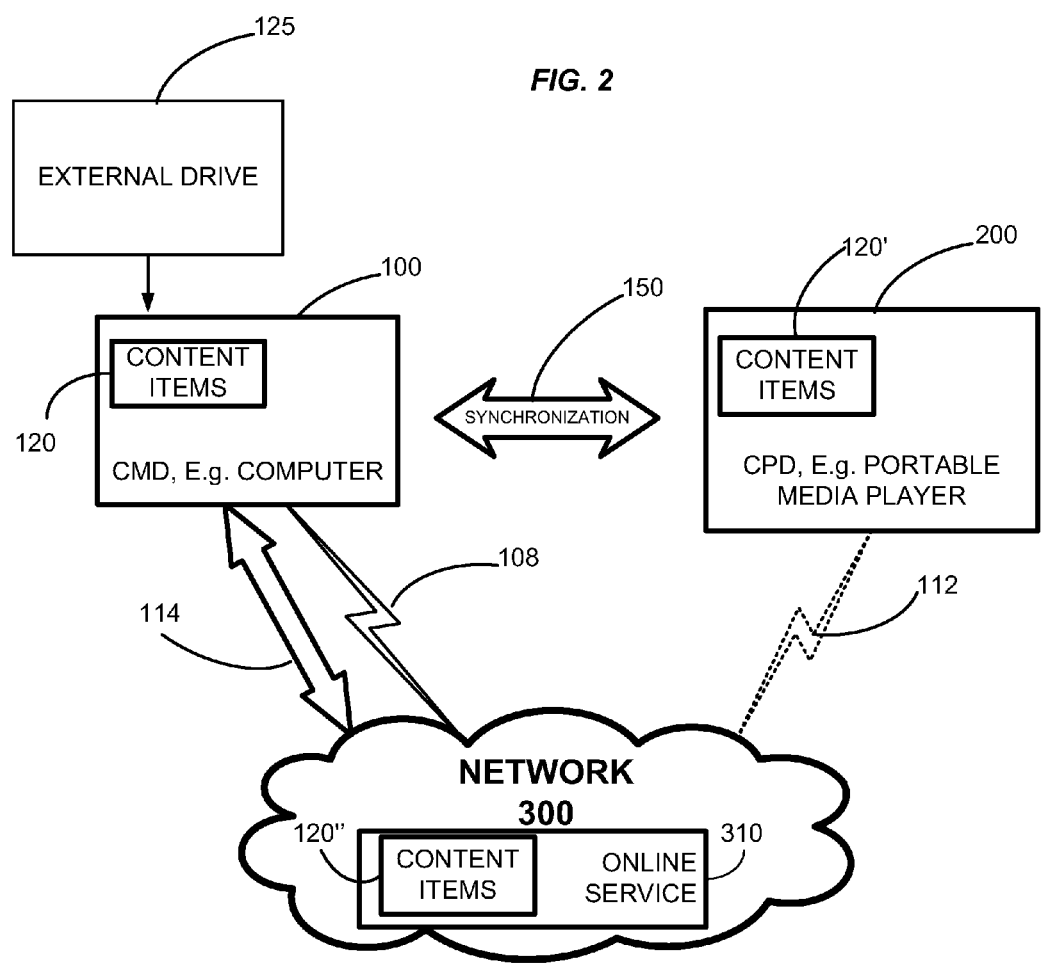
FIG. 2 illustrates a simplified functional block diagram of an exemplary communication environment in which the methods described herein may be implemented or used.

FIG. 2 illustrates another view of the arrangement of FIG. 1, emphasizing the communications environment. Again, a content management device 100, here shown as a laptop, is connected via the synchronization link 150 to a content playback device, here shown as a portable media player. The content items 120 and 120' are shown on each, respectively. The content management device 100 includes an external drive 125. The external drive 125 may be, e.g., an internal or external hard drive or CD/DVD-ROM drive. The external drive 125 may be a partition on the hard drive within the laptop or even a different folder, and may even be stored content accessible by a wired or wireless network. In general, the external drive 125 is separate from a main media content library.

The content management device 100 may be connected to a network 300 via a wired link 114 or a wireless link 108. The content playback device 200 may also be connected to the network 300 via a link; a wireless link 112 is shown, although a wired link is also possible (not shown). An exemplary online service 310 is shown within the network, the same generally includes a set of content items 120", which the user may purchase and download either immediately or perform a download-on-demand later, at a time of the user's convenience.

Figure 3:
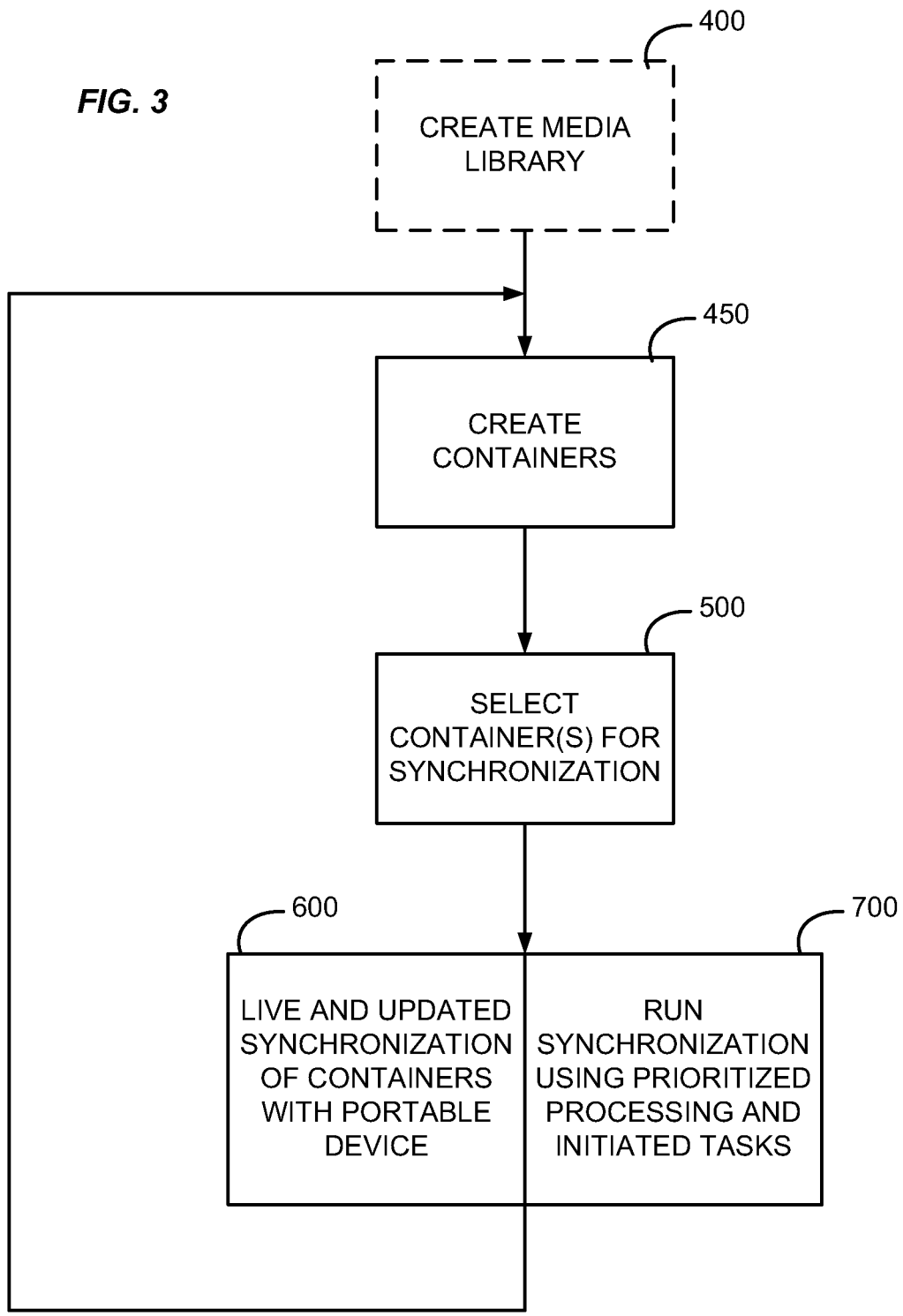
FIG. 3 is a flowchart illustrating certain aspects of a synchronization method.

FIG. 3 is a flowchart illustrating certain exemplary methods. Details of these methods are described in the following figures.

First, an initial optional step is shown of creating a media library 130 (step 400). In many cases, a media library will already have been created.

Figure 4:
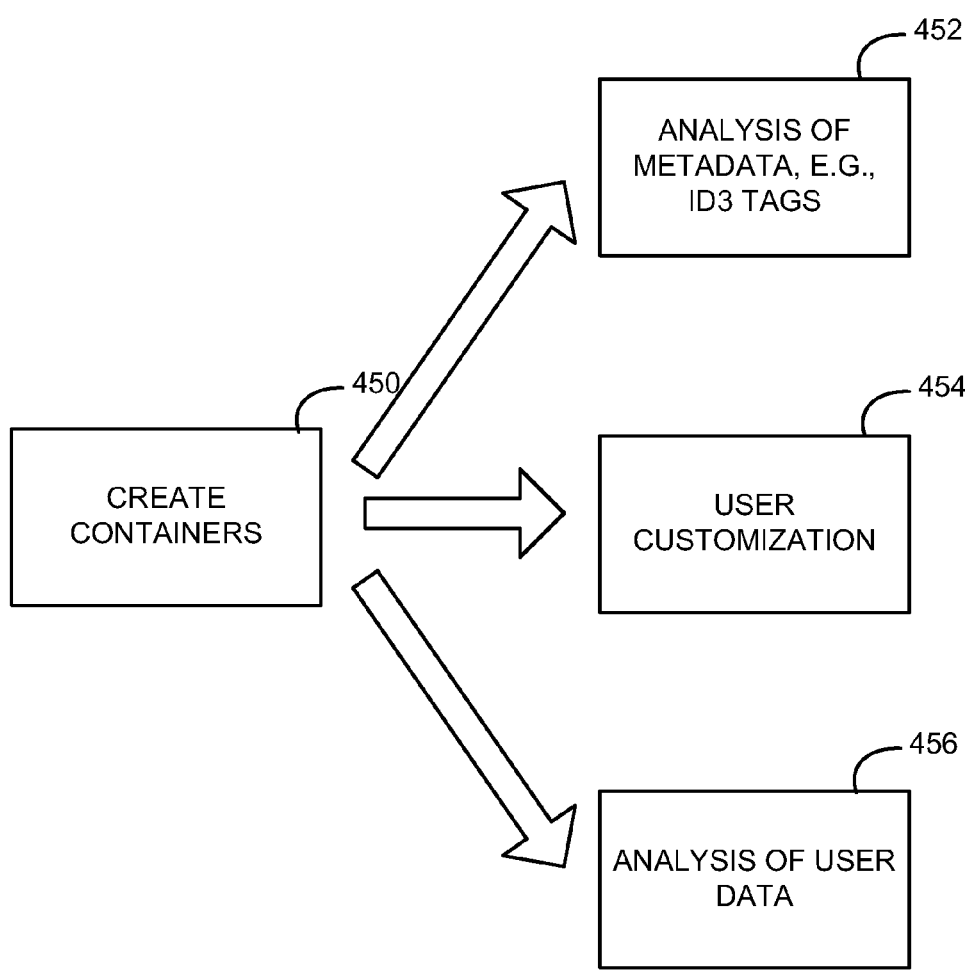
FIG. 4 is a flowchart illustrating more detailed aspects of a step within the synchronization method of FIG. 3.

A next step is to create containers (step 450). As noted above, containers may be generated in a number of ways, such as by the action of a filter on the media library 130. In more detail, as shown in FIG. 4, containers may be created (step 450) via analysis of metadata and automatic creation of containers (step 452), via user customization (step 454), and/or via analysis of user data (step 456), such as number of times a given content item has been played. A combination of all of these steps may also be performed. User history, which may be analyzed using an intelligent network, e.g., an expert system, may also be used to develop containers that may be especially pertinent to the user.

Referring back to FIG. 3, a next step is to select containers for synchronization (step 500). One way of performing this step is to "drag-and-drop" the containers onto an icon of the content playback device 200. In this way, the virtual object (of the container) is clicked-on and then dragged on top of another virtual object (the icon of the content playback device). This action associates the container with the content playback device 200. This association generally continues until a contrary operation is performed, such as the user dragging-and-dropping the container off of or away from the content playback device. The drag-and-drop operation can of course be replaced with any number of user operations that may serve to associate the container with the content playback device 200.

Figure 5:
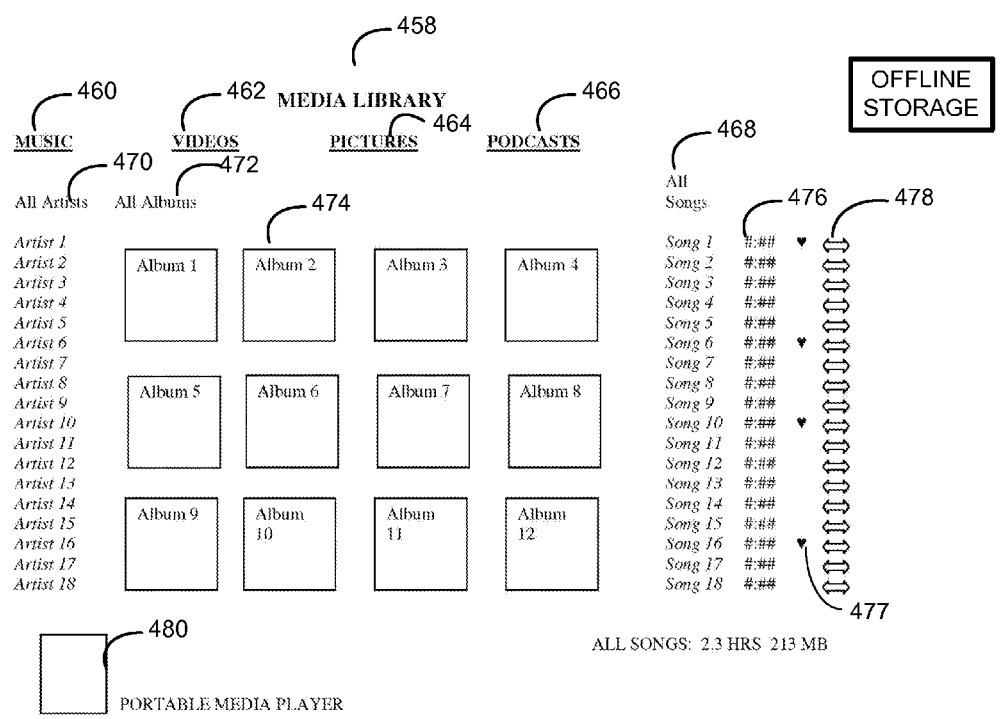
FIG. 5 illustrates an exemplary user interface on a content management device of a media library by which a user may take advantage of the synchronization arrangement.

FIG. 5 illustrates a user interface that may be employed to carry out such steps. A user interface 458 for the media library 130 is shown along with icons for display of music 460, videos 462, pictures 464, and podcasts 466. In FIG. 5, it is presumed that the music icon has been selected, although an analogous description may apply for the other icons. Within the music interface, icons are shown for display of all artists 470, all albums 472, and all songs 468. Other icons may be provided as desired. For example, album covers 474 are also displayed, along with a summary of the total file size and playing time of all songs 482. The individual playing time for a given song is shown in column 476 adjacent the song title. Adjacent the playing time column may be a heart or the like to indicate a favorable rating 477 for the given song. Additional hearts may be provided to indicate even more favorable ratings, and any other such rating scheme may also be employed. Finally, column 478 indicates that the song has been synchronized with the content playback device.

A content playback device or portable media player icon 480 is displayed in FIG. 5, and it is by dragging icons onto the icon 480 that containers are selected and associated. In particular, the dragged icon represents metadata, and all content items with that metadata are then filtered and scheduled for synchronization with the content playback device. The drag operation creates rules based on what type of item is dragged. In this way, synchronization rules are derived without users needing to know anything about them. For example, if a user drags an artist icon onto icon 480, then an artist container is created, and all songs by that artist will be synchronized. If a user drags an album icon onto icon 480, then an album container is created, and all songs in that album will be synchronized. If a user drags a heart icon onto icon 480, then a favorable rating container is created, and all songs with favorable ratings will be synchronized. Various other containers are possible. For example, in an interface where genres are displayed, if a user drags a genre icon onto icon 480, then a genre container is created, and all songs with that genre will be synchronized.

Figure 6:
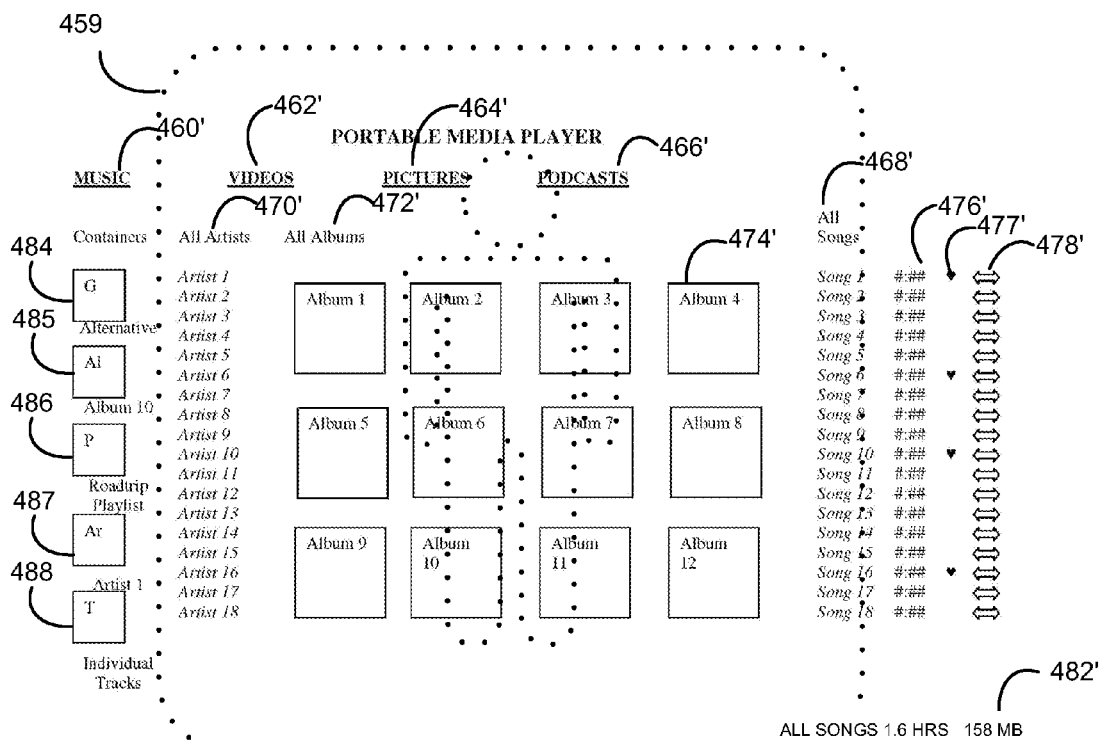
FIG. 6 illustrates an exemplary user interface on a content management device representing a content playback device by which a user may take advantage of the synchronization arrangement.

By clicking on the content playback device icon, or via an analogous procedure, the content items on the content playback device may be displayed. Referring to FIG. 6, a user interface 458' is displayed that allows the user to view the contents of the media library 130' of the content playback device. Icons are shown for display of music 460', videos 462', pictures 464', and podcasts 466'. In FIG. 6, it is presumed that the music icon has been selected, although an analogous description may apply for the other icons. Within the music interface, icons are shown for display of all artists 470', all albums 472', and all songs 468'. As above, album covers 474' are also displayed, along with a summary of the total file size and playing time of all songs 482'. The individual playing time for a given song is shown in column 476' adjacent the song title. Adjacent the playing time column may be a heart or the like to indicate a favorable rating 477' for the given song. Additional hearts may be provided to indicate even more favorable ratings, and any other such rating scheme may also be employed. Finally, column 478' indicates that the song has been synchronized with the content playback device. In some user interfaces, this or other columns may be hidden, especially as songs on the content playback device have generally all undergone some level of synchronization. However, in some cases, where content items are placed on the content playback device without storage on the content management device, as described below, then a different icon (or no icon) may be displayed.

A number of containers 484-488 are also displayed on the left-hand-side of the interface of FIG. 6. These containers represent the containers that the user has associated with the content playback device 200, such as via a drag-and-drop operation. In FIG. 6, the container 484 is a genre container for alternative music, the container 485 is an album container for Album 10, the container 486 is a playlist container for a Roadtrip Playlist, the container 487 is an artist container for Artist 1, and the container 488 is a track container containing all the music items simply listed and playable by track.

Following the association operation, a synchronization step may occur. The arrangement provide several types of synchronization operations, which may be employed separately or in combination.

In one type of synchronization operation, a live or automatic synchronization of containers may occur (step 600). Referring to FIG. 7(A), in this type of synchronization operation, synchronization begins without the need for a specific user initiation, i.e., the user need not press any sort of "BEGIN SYNCHRONIZATION" button or the like. In this way, synchronization may occur whenever needed, and thus can efficiently consume resources whenever available, rather than having to wait for a user command. Of course, a user initiation is not intended to be precluded by the arrangement, and the like may be provided as a user option. In this connection, a "STOP SYNCHRONIZATION" button may be provided, the same serving to stop all synchronizations, no matter the method used to accomplish the synchronization, including the methods described here. This button may be toggled to either stop or begin synchronizations as desired by the user.

Live synchronization may be accomplished in at least one of three ways, which may also occur in various combinations. In one way, a synchronization operation may simply occur periodically (step 602). In this way, synchronization occurs every few minutes or on any other schedule as determined by the content management device or user. In a second way, a synchronization operation occurs whenever the content management device 100 detects a change in a container 102 (step 604). For example, if a content item 120 is added to a container 102, and the container 102 is associated with the content playback device 200, then a synchronization operation may occur as soon as is feasible, e.g., immediately or soon thereafter, without user initiation. In the same way, if a drag-and-drop operation is performed on a container, again a synchronization operation may occur as soon as is feasible.

Figure 7B:
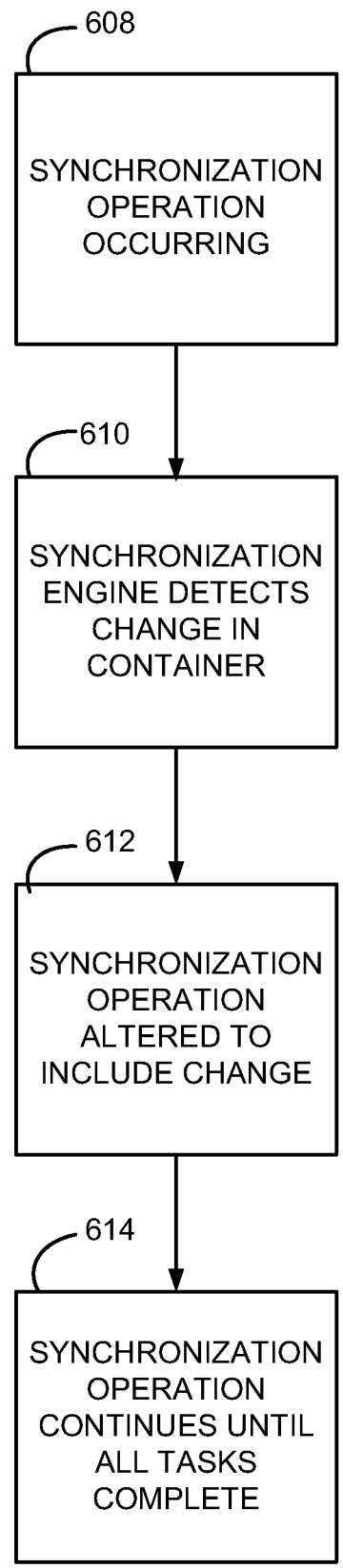

In a third way, and referring in addition to FIG. 7(B), a currently-running synchronization operation may be modified when the content management device 100 detects a change in a container 102 (step 606). In this example, a synchronization operation is being performed (step 608), and a modification is made to a container 102 and detected by the synchronization engine or content management application (step 610). For example, the user may choose additional content items 120, drop them on the content playback device 200, and the synchronization engine 110 modifies an internal work flow or task list (step 612) to add the new tasks, i.e., add the new item(s) that require synchronization. In this arrangement the internal work flow or task list is generated, created and maintained in a dynamic fashion, such that new tasks can be added conveniently. In any case, the modification to the internal work flow or task list may entail altering the status information regarding how much work is remaining. In any case, the synchronization process is continued (step 614) until all required synchronization actions have been completed. It should be noted that multiple such additions to a synchronization process may occur, e.g., multiple drag-and-drop operations or multiple alterations to content items within synchronized containers, and each change results in the addition of tasks to the task list or work flow of the currently-running synchronization operation; no new synchronization operation need be commenced.

Figure 8:
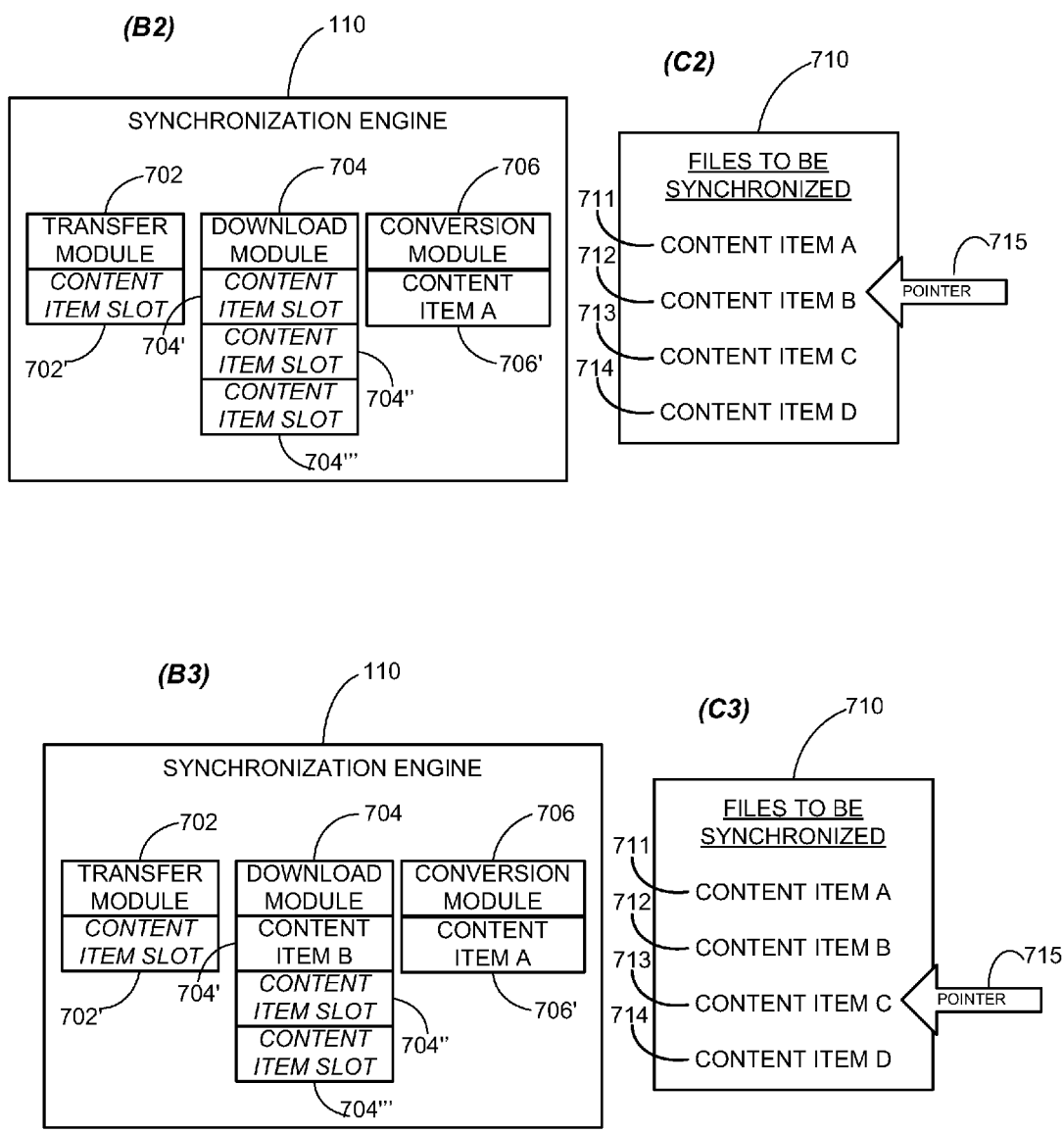
Figure 8:
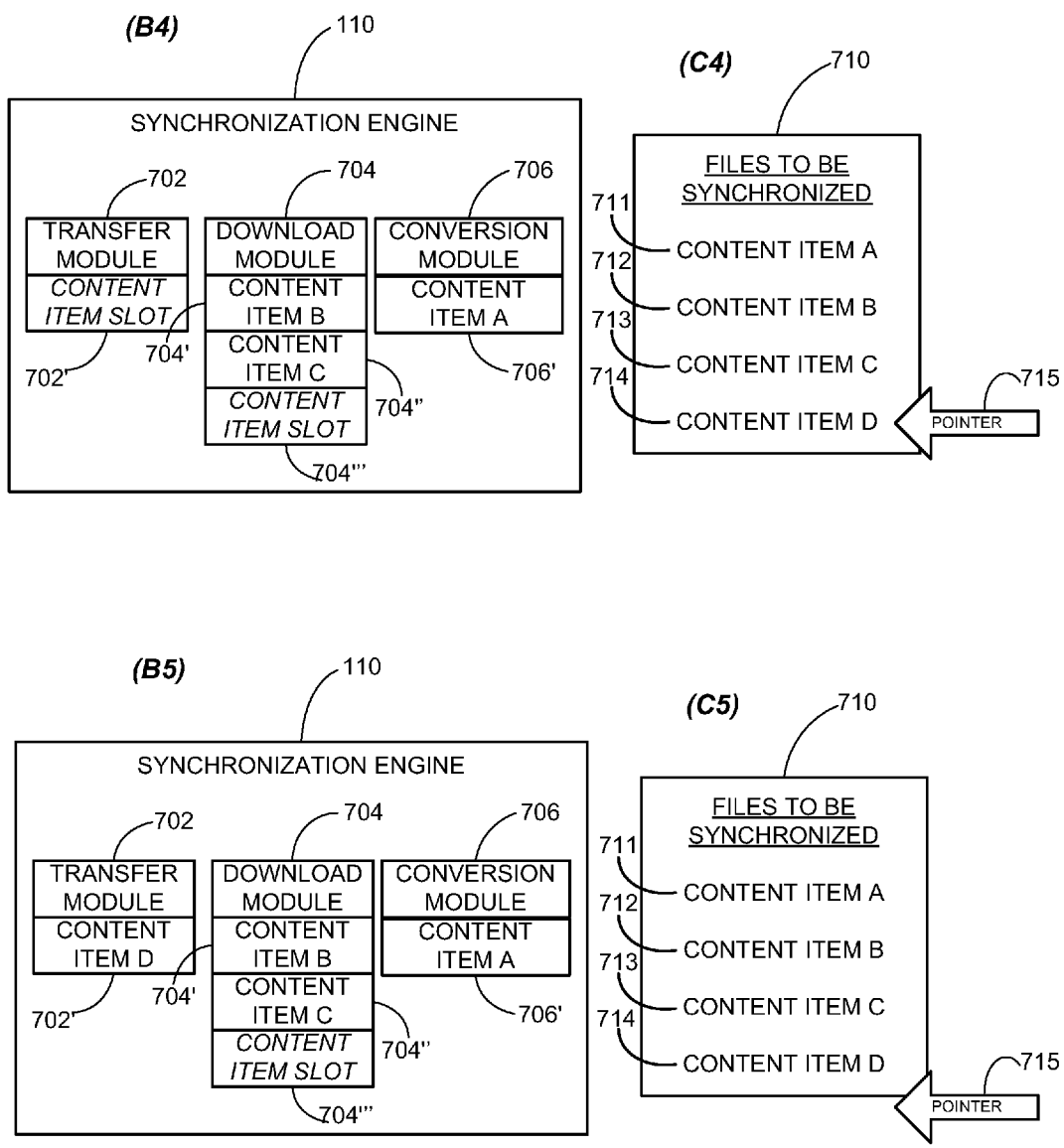

In another type of synchronization operation, and referring to FIGS. 8(A) and 8(B1)-(B5) and 8(C1)-(C5), synchronization is performed using prioritized processing and initiation of dependent tasks (step 700). In particular, the arrangement allows for a producer/consumer model in the synchronization engine where the same is responsible for consuming incoming tasks in an, e.g., FIFO system. Tasks may include transferring, updating, and deleting files to or from the content playback device. The tasks are provided by a producer which is, e.g., monitoring the media library for items that need the above actions performed. The producer may also monitor the content playback device for the same.

As tasks are added to a work queue, the synchronization engine reviews them and determines when an action is capable of being immediately performed, where "immediately performed" means, for example, that a transfer can occur without any prerequisite tasks first being performed on the content item. If it is, the action is performed and a pointer moves to the next task. If the action is not capable of being immediately performed, then the synchronization engine queues a new task of higher priority that is necessary before the initial action can be performed, i.e., a prerequisite task. The pointer is reset to, e.g., the beginning of the queue. Once either of the tasks is performed, the pointer moves to the next item and repeats the process. If resources are available to take action on the next task, the next task is performed; otherwise, it moves on to the next item in the queue. In this way, increased efficiency is obtained in use of limited I/O bandwidth and/or CPU capabilities.

In certain versions of the above arrangement, it is noted that the entire work queue may be reviewed or re-evaluated to ensure that the highest priority tasks are performed first, and that the performance of all the tasks is done in a manner to minimize the overall synchronization time.

Referring in particular to the exemplary FIGS. 8(B1) and 8(C1), a synchronization engine 110 includes a transfer module 702 having an associated content item slot 702', a download module 704 having associated content item slots 704', 704", and 704''', and a conversion module 706 having an associated content item slot 706'. The differing numbers of content item slots refer to the differing number of processes that can be contemporaneously performed. In this exemplary arrangement, only one content item can be transferred, from a content management device to a content playback device, at a time, so only one content item slot is provided. Three content items can be downloaded at a time, so three content item slots are provided. Only one content item can be converted at a time, such as in format or bitrate, so only one content item slot is provided. It should be noted that the number of slots is generally variable, and can be determined by the arrangement on-the-fly, e.g., by analysis of CPU function. If a processor is running slowly, then less slots may be provided, and vice-versa for a relatively unoccupied processor.

FIG. 8(C1) shows a list of the files 711-714 to be synchronized, as well as a pointer 715 to the first task to be performed. In FIG. 8(C1), it is noted that the pointer 715 points to a task that has not yet begun to be performed. Also in these figures, for clarity while the pointer is pointing at particular content items, it is understood that the pointer would typically point to the first of a series of tasks to be performed to, e.g., transfer the content items. Having the pointer point to the content item itself is a shorthand employed for clarity's sake.

In the example of FIGS. 8(B1) and 8(C1), content item A needs to be converted to a format compatible with the content playback device, B and C need to be downloaded from an online service such as a web store, and D can be transferred immediately. The files are queued in the order above and as shown in FIG. 8(C1).

As the synchronization engine 110 reaches content item A (element 711), the same determines that a conversion is necessary before the transfer of the item 711 can occur. Consequently a conversion task is queued ahead of the transfer of the item 711, and this transfer is marked as dependent on the conversion. In FIG. 8(B2), the item 711 has been moved to a conversion module and parentheses surround content item A in FIG. 8(C2) to indicate that the same has a task that requires completion prior to transfer. The conversion of item 711 can begin immediately, even though only one item can be converted at a time, as no items are currently being converted by the conversion module 706.

The transfer of content item B (item 712) may then begin; however, the synchronization engine 110 determines that a download is necessary before the transfer of the item 712 can occur. Consequently a download task is queued ahead of the transfer of the item 712, and this transfer is marked as dependent on the conversion. In FIG. 8(B3), the item 712 has been moved to a download module and parentheses surround content item B in FIG. 8(C3) to indicate that the same has a task that requires completion prior to transfer. The download of item 712 can begin immediately, as three items can be downloaded at a time, and as no items are currently being downloaded by the download module 704.

The transfer of content item C (item 713) may then begin; however, the synchronization engine 110 determines that a download is necessary before the transfer of the item 713 can occur. Consequently a download task is queued ahead of the transfer of the item 713, and this transfer is marked as dependent on the conversion. In FIG. 8(B4), the item 713 has been moved to a download module and parentheses surround content item C in FIG. 8(C4) to indicate that the same has a task that requires completion prior to transfer. The download of item 713 can begin immediately, as three items can be downloaded at a time, and only one item is currently being downloaded by the download module 704.

The transfer of content item D (item 714) may then begin; in this case, the transfer of the item 714 can begin immediately, as no items are currently being transferred by the transfer module 702 and the item 714 requires no pre-processing.

At this step in the sequence four tasks are happening contemporaneously. When the conversion of content item A, or the download of content item B or C, is completed, their respective transfers are re-attempted. It may be found that yet another task is prerequisite to the transfer, e.g., it may be that content item B or C has to be converted, in which case another prerequisite task is queued ahead of the same's transfer.

If a content item E (not shown) were now introduced to the queue but required conversion, its conversion would be queued ahead of its transfer, but since there are no free conversion slots, the conversion itself would be delayed until a free resource was available. Similarly, if two more downloads were required, the first would start immediately while the second would be delayed until one of the three active downloads completed.

In alternative arrangements, the availability of resources (e.g., for conversion, download, etc.) may be self-adjusting based on past experience, network utilization, etc.

In another aspect of the method and user interface, as may be seen by comparing FIGS. 5 and 6, a background image 459 may be displayed on the interface for the content playback device 200. The background image 459 may be the same as a background image displayed on the screen 207 of the content playback device 200, although the image 459 may be reproduced as more of a watermark, in order to ensure legibility of the user interface. In particular, the user may customize the background image seen when navigating the contents of the content playback device using the device's user interface. For example, a personal photo may be seen which has been previously synchronized with the device. When viewing the contents of the device using the interface of FIG. 6, the same background image may be seen (though it may be resized or tiled or stretched as appropriate and desired). By keeping the pictures the same, the user is provided with a valuable customization. The user is also provided with a cognitive link that indicates to the user that they are currently viewing the contents of their device, as opposed to viewing the media library contents of, e.g., their personal computer.

In another aspect of the arrangement, content items 120 may be synchronized to the content playback device 200 without adding the content item files to the user's media library 130. In particular, users may desire to place content items 120 directly on a content playback device 200 as part of media library 130' but without occupying space in their main media library 130. For example, many news items, lectures, podcasts, are only listened to once, and thus permanent storage is unnecessary and may be undesirable. Another example may be a data CD full of music files or the like, which are archived and need not necessarily be stored on the user's hard drive. Moreover, a data CD full of music files is not always available in the same way as a hard drive generally is. This method is further intended to encompass content items stored in an online store and downloaded on demand directly to a content playback device. In this way, users may, e.g., listen to an album prior to downloading the same onto their hard drive.

In this method, the user may copy content from a normally-offline location, e.g., external drive 125, directly onto their content playback device. This allows the content items to be transferred but to not clutter the user's media library 130. In one implementation, metadata associated with the transferred files may still be maintained in the media library 130, allowing other functionality associated with the synchronization engine to apply to those content items, e.g., automatic content management such as ongoing metadata updates if the original files are altered in some way.

Figure 9:
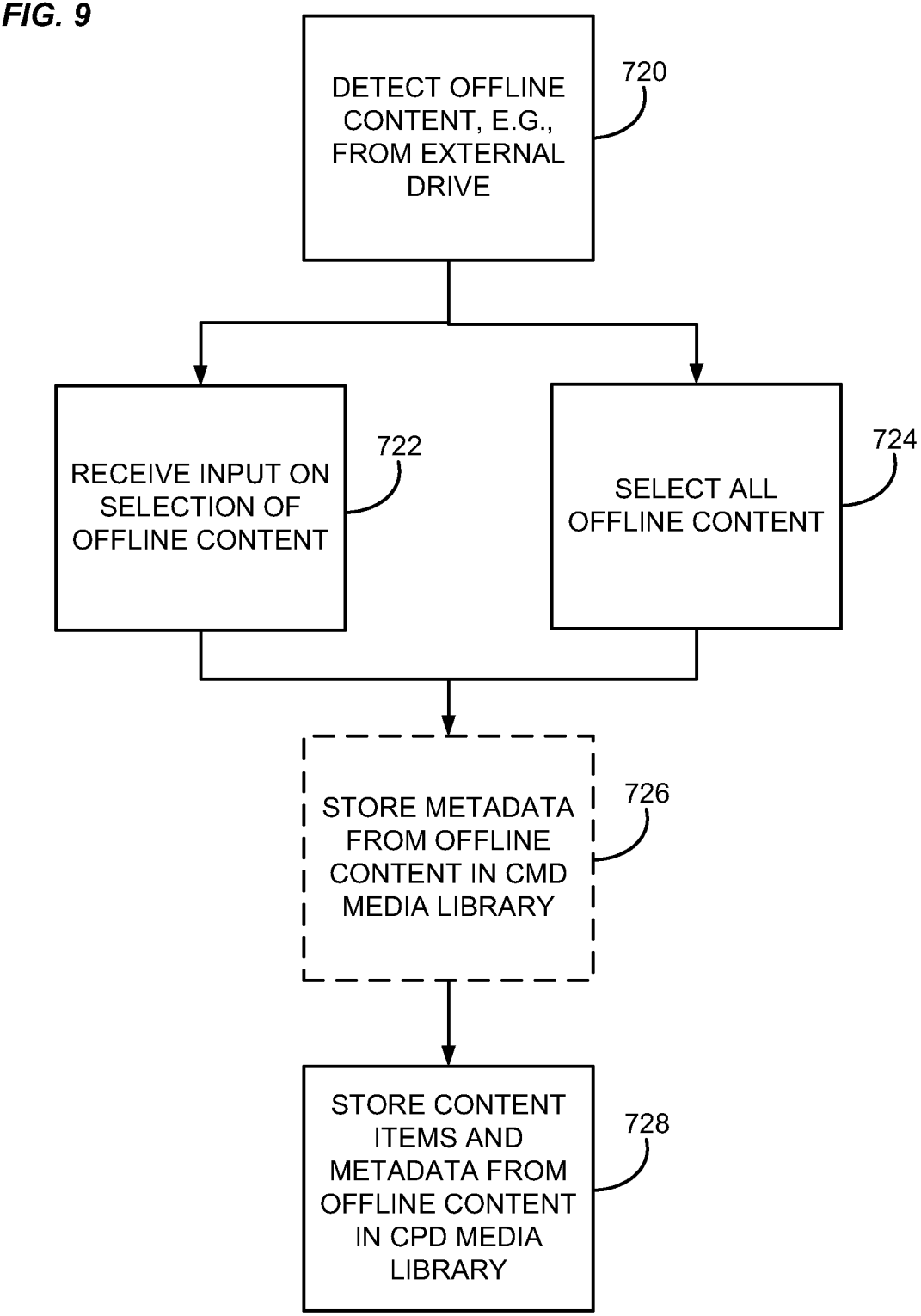
FIG. 9 is a flowchart illustrating certain aspects of a synchronization method performed by the arrangement.
Figure 10:
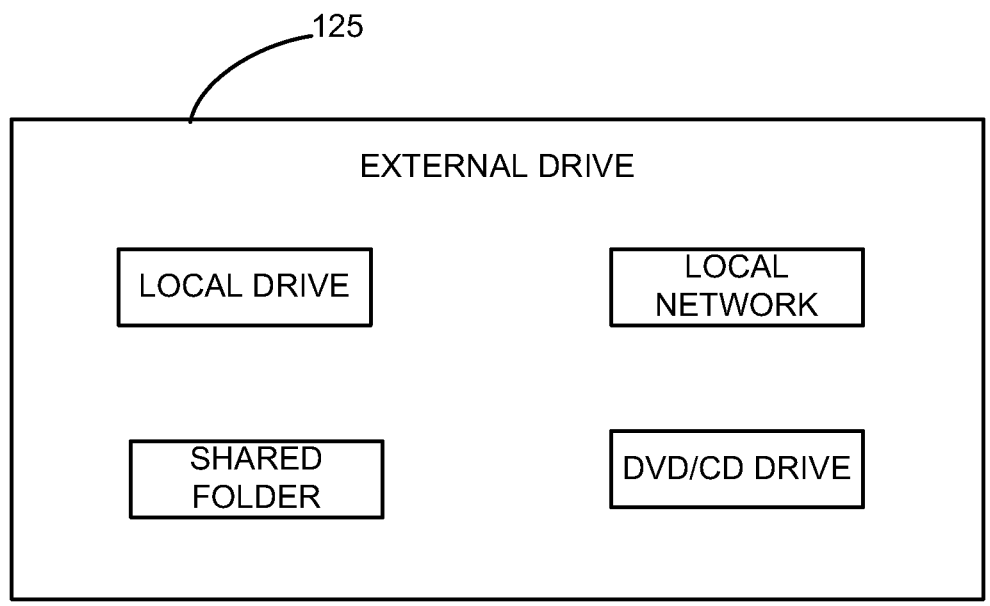
FIG. 10 shows an exemplary external drive.
Figure 11:
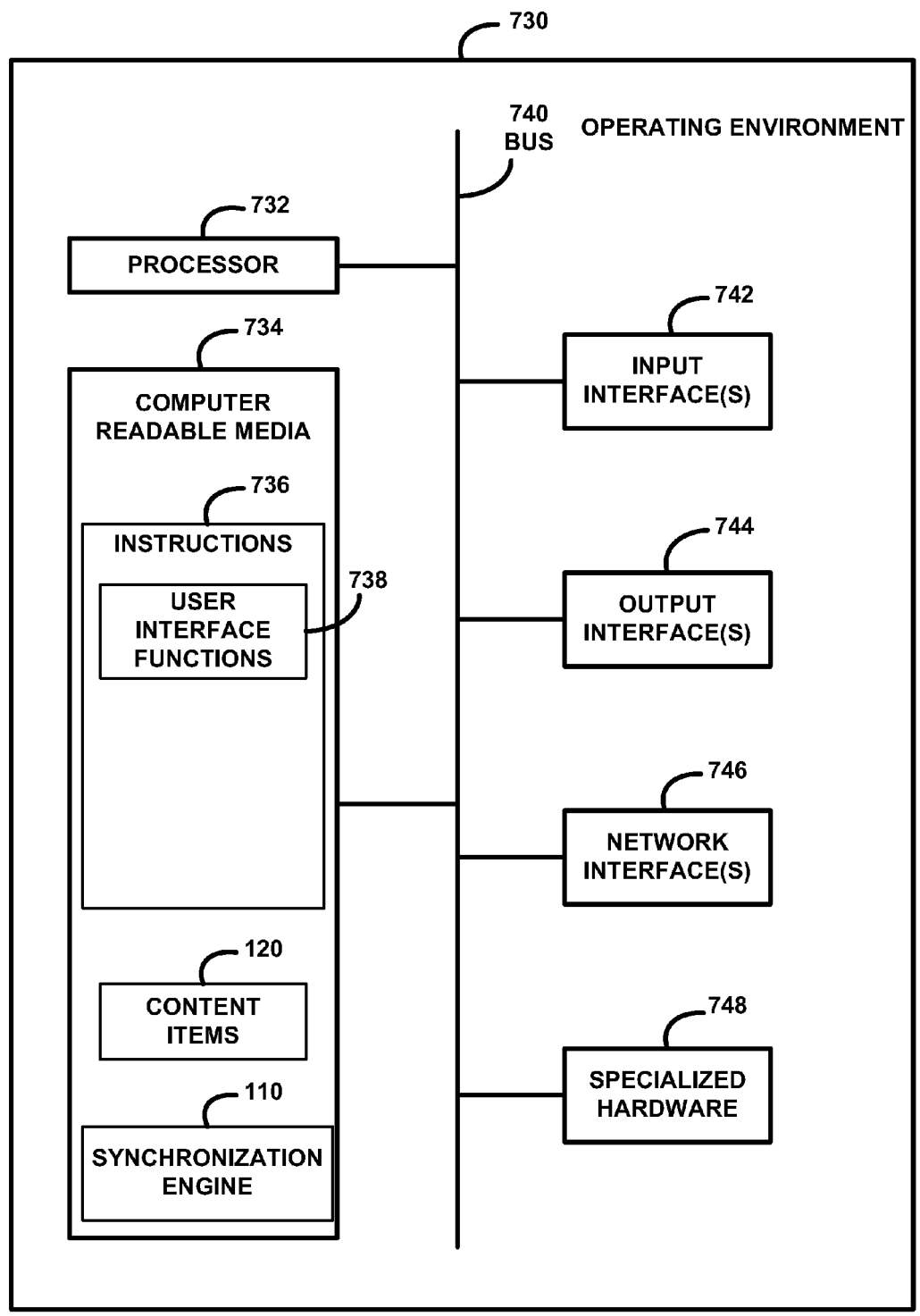
FIG. 11 is a simplified functional block diagram of an exemplary configuration of an operating environment in which the synchronization arrangement may be implemented or used.

Referring to FIG. 9, a method is shown to accomplish the above. First, offline content, such as the external drive 125, is detected (step 720). Next, either a subset of the detected offline content may be selected to be placed on the content playback device (step 722), or the entire contents of the detected offline content may be selected to be placed on the content playback device (step 724). The particular files desired to be synchronized may be chosen by review of the files on whichever disk or other source they reside. Referring to FIG. 10, a menu such as is given for My Computer may allow the user to navigate to the particular file or folder and drag-and-drop the same onto the content playback device icon. This type of operation may be used to indicate that the items are not to be stored on the content management device. On the other hand, dragging the items onto a content management device icon (not shown) or anywhere on the content management device user interface (see FIG. 5) may indicate that the items are to be added to the media library 130. In an analogous procedure for adding items to the content playback device, the content playback device user interface may include a "GET OFFLINE CONTENT" button that which selected allows the user to navigate to a file or folder and to indicate that the same should be added to the content playback device, bypassing the content management device.

In any case, and referring back to FIG. 9, the metadata from the offline content may be optionally stored in the media library of the content management device (step 726). The same may be stored in a hidden fashion, so that various actions the user may take are applied to the offline content on the content playback device, while not appearing in the content management device user interface and confusing the user. Finally, the metadata and the content items themselves are copied, transferred, or otherwise placed onto the content playback device (step 728).

Thus, it can be seen that the arrangements described enable a convenient way to synchronize a content management device with a content playback device.

FIG. 10 is a block diagram of an exemplary configuration of an operating environment 730 (such as a client-side device or application or a networked server or service) in which all or part of synchronization engine 110 and/or the methods shown and discussed in connection with the figures may be implemented or used. Operating environment 730 is generally indicative of a wide variety of general-purpose or special-purpose computing environments, and is not intended to suggest any limitation as to the scope of use or functionality of the arrangements described herein.

As shown, operating environment 730 includes processor 732, computer-readable media 734, and computer-executable instructions 736. One or more internal buses 740 may be used to carry data, addresses, control signals, and other information within, to, or from operating environment 730 or elements thereof.

Processor 732, which may be a real or a virtual processor, controls functions of the operating environment by executing computer-executable instructions 736. The processor may execute instructions at the assembly, compiled, or machine-level to perform a particular process.

Computer-readable media 734 may represent any number and combination of local or remote devices, in any form, now known or later developed, capable of recording, storing, or transmitting computer-readable data, such as the above-noted computer-executable instructions 736, including user interface functions 738 and synchronization engine 110, and content items 120. In particular, the computer-readable media 734 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. The computer-readable media may also include transmission media and data associated therewith. Examples of transmission media/data include, but are not limited to, data embodied in any form of wireline or wireless transmission, such as packetized or non-packetized data carried by a modulated carrier signal.

Computer-executable instructions 736 represent any signal processing methods or stored instructions. Generally, computer-executable instructions 736 are implemented as software components according to well-known practices for component-based software development, and encoded in computer-readable media. Computer programs may be combined or distributed in various ways. Computer-executable instructions 736, however, are not limited to implementation by any specific embodiments of computer programs, and in other instances may be implemented by, or executed in, hardware, software, firmware, or any combination thereof.

Input interface(s) 742 are any now known or later developed physical or logical elements that facilitate receipt of input to operating environment 730.

Output interface(s) 744 are any now known or later developed physical or logical elements that facilitate provisioning of output from operating environment 730.

Network interface(s) 746 represent one or more physical or logical elements, such as connectivity devices or computer-executable instructions, which enable communication between operating environment 730 and external devices or services, via one or more protocols or techniques. Such communication may be, but is not necessarily, client-server type communication or peer-to-peer communication. Information received at a given network interface may traverse one or more layers of a communication protocol stack.

Specialized hardware 748 represents any hardware or firmware that implements functions of operating environment 730. Examples of specialized hardware include encoder/decoders decrypters, application-specific integrated circuits, clocks, and the like.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method of synchronizing a content playback device with a content management device, comprising:
   generating a plurality of containers on a content management device, each container storing a subset of content items within a media library, the subset of content items identified by applying filters to the media library in such a manner that a particular content item is in two or more of the plurality of containers, the content items being files that are to be played back on a content playback device;
   associating a container on the content management device with a container on the content playback device, the content playback device storing a plurality of containers, each container configured to store content items within;
   receiving an operation on the container on the content playback device;
   comparing the container on the content management device and any content items within the container with the container on the content playback device and any content items within, and if the container on the content management device and any content items within differ from the container on the content playback device and any content items within, then generating a list of tasks necessary to make the container on the content management device and any content items within the same as the container on the content playback device and any content items within;
   performing the list of tasks to accomplish at least a partial synchronization;
   while performing the list of tasks, detecting a concurrent user-directed addition, deletion or modification of a content item within one container of either the container on the content management device or the container on content playback device, and modifying the task list to add, delete or modify the content item, respectively, in the other container of either the container on the content management device or the container on the content playback device; and
   adding, deleting or modifying the content item, respectively, in accordance with the modified task list while performing the list of tasks and before finishing the at least partial synchronization.

2. The method of claim 1, in which the tasks are selected from the group consisting of copying a content item to the content playback device, deleting a content item on the content playback device, moving a content item to the content playback device, modifying a content item on the content management device or on the content playback device, altering a format of a content item, or altering a bit rate of a content item.

3. The method of claim 1, in which the content playback device is a portable media player.

4. The method of claim 1, in which the generating a plurality of containers includes receiving input from a user about a custom container, and creating the custom container according to the user input.

5. The method of claim 1, in which the generating a plurality of containers includes generating containers using an expert system and analyzing user history.

6. The method of claim 1, in which the operation is a drag-and-drop operation.

7. The method of claim 1, in which the content playback device includes a screen, and further comprising:
   displaying a user interface on the screen;
   displaying an image as a part of the user interface on the screen; and
   displaying the image on a user interface on the content management device corresponding to the media library stored on the content playback device.

8. The method of claim 1, further comprising an external drive, and further comprising:
   detecting at least one content item on the external drive;
   copying the content item to the content playback device; and
   copying metadata pertaining to the content item to the content management device.

9. The method of claim 8, further comprising copying all content items from the external drive to the content playback device.

10. The method of claim 1, further comprising:
   determining if a first task in the list is to be performed immediately, or if a prerequisite task must be performed before the first task, and if the first task is to be performed immediately, performing the first task, otherwise performing the prerequisite task and then the first task; and
   during the time of performing the prerequisite task, commencing performance of a second task.

* * * * *